(12) United States Patent
Yamato et al.

(10) Patent No.: US 6,191,789 B1
(45) Date of Patent: Feb. 20, 2001

(54) RAY CASTING METHOD USING HARDWARE

(75) Inventors: Sachio Yamato; Daisaku Yamane; Masaharu Tomita; Masashi Ishikawa; Yuki Sutou; Kengo Toeda, all of Mitaka (JP)

(73) Assignee: Japan Radio Co., Ltd., Tokyo (JP)

( * ) Notice: Under 35 U.S.C. 154(b), the term of this patent shall be extended for 0 days.

(21) Appl. No.: 09/148,656

(22) Filed: Sep. 4, 1998

(30) Foreign Application Priority Data

Sep. 16, 1997 (JP) .................................................. 9-251024

(51) Int. Cl.[7] .................................................. G06T 17/00
(52) U.S. Cl. ............................................ 345/424; 345/426
(58) Field of Search .................................... 345/419, 420, 345/424, 426, 430

(56) References Cited

U.S. PATENT DOCUMENTS

| 5,101,475 | 3/1992 | Kaufman et al. . |
| 5,313,567 | 5/1994 | Civanlar et al. . |
| 5,760,781 | * 6/1998 | Kaufman et al. ..................... 345/424 |
| 5,933,146 | * 8/1999 | Wrigley ................................ 345/420 |

FOREIGN PATENT DOCUMENTS

| WO 96/07989 | 3/1996 | (WO) . |
| WO 96/17326 | 6/1996 | (WO) . |

OTHER PUBLICATIONS

Pfister, Hanspeter et al., Cube–4—A Scalable Architecture for Real–Time Volume Rendering, Proceedings of the Symposium on Volume Visualization, US, New York, IEEE/ACM, Oct., 1996, pp. 47–54.

Kanus U. et al., Implementations of Cube–4 on the Teramac Custom Computing Machine, Computers and Graphics, GB, Pergamon Press Ltd. Oxford, vol. 21, No. 2, Mar. 1997, pp. 199–208.

De Boer, M. et al., Latency –and Hazard–Free Volume Memory Architecture for Direct Volume Rendering, Computers and Graphics, GB, Pergamon Press Ltd. Oxford, vol. 21, No. 2, Mar. 1997, pp. 179–187.

* cited by examiner

Primary Examiner—Mark Zimmerman
Assistant Examiner—Kimbinh T. Nguyen
(74) Attorney, Agent, or Firm—Oliff & Berridge, PLC (57) ABSTRACT

Ray casting method is performed using a hardware. Ray casting is performed on a 3D object formed in a three-dimensional array of voxels, luminance information is generated for each unit ray path based on voxel information assigned to the voxels on the ray path, and an image related to the 3D object are generated based on the luminance information. At this time, pattern information representing a pattern of the ray paths is previously stored in a branch point table memory. A memory control section determines ray paths for generating the luminance information based on the pattern information.

7 Claims, 10 Drawing Sheets

| PRINCIPAL AXIS DISTANCE | 0 | 1 | 2 | 3 | 4 | 5 | 6 | n-1 |
|---|---|---|---|---|---|---|---|---|
| BRANCH POSITION | 0 | 1 | 0 | 2 | 1 | 5 | 0 | m |

PRINCIPAL
AXIS DISTANCE →

```
0  1  0  2  1  5  0  4  3  8  1  8  3  13 0  8  7  14 3  13 6  20 1  17 6  22 3  16 11 29 0  16
15 26 7  23 12 34 3  28 11 35 6  25 18 44 1  32 15 43 6  31 20 50 3  41 14 46 11
32 27 61 0  32 31 50 15 43 24 62 7  50 21 61 12 43 32 74 3  53 26 70 11 50 33
79 6  64 23 71 18 49 42 92 1  65 30 82 15 58 41 95 6  74 29 85 20 59 48 106 3
72 39 99 14 71 44 106 11 89 30 94 27 64 59 125 0  64 63 98 31 83 48 118 15
94 41 113 24 79 60 134 7  95 48 124 21 88 59 137
```

42: BRANCH POINT TABLE

Fig. 16

RAY CASTING METHOD USING HARDWARE

BACKGROUND OF THE INVENTION

1. Field of the Invention

The present invention relates to a ray casting method using hardware.

2. Description of the Prior Art

Ray casting is known as a method of rendering using CG. In this technique, an object formed by a voxel is first arranged in a virtual three-dimensional space defined in a memory space. Internal information of the object is given as a plurality of voxel values to each voxel. A plurality of unit rays are virtually radiated from a view point present at a predetermined position in the virtual three-dimensional space. Each pixel value on a display plane is calculated based on the voxel values of the voxels present on each unit ray.

According to such a ray casting method, various internal information of the object can freely be visualized to satisfy requirements. Therefore, attention has recently been paid to the ray casting method as a new visualization technique (volume visualization) for a three-dimensional object including an organism.

However, it is necessary to calculate a path for a ray radiated from a view point and voxels on the path in real time. This is difficult to realize using hardware. Conventionally, software has mainly been used for implementation, and a lot of processing time is required. In a case where the view point and the object are moved in the virtual three-dimensional space, it is difficult to generate images reflecting their movement in real time.

SUMMARY OF THE INVENTION

The present invention has been made in consideration of the above-mentioned problems, and its object is to provide an image synthesizing apparatus and method capable of performing high speed image processing using hardware.

In order to solve the above-mentioned problems, a first aspect of the present invention is directed to an image processor which casts a number of unit rays onto a virtual three-dimensional object formed with a three-dimensional array of a voxels, generates visualization information for each ray path based on voxel information assigned to at least one voxel on the ray path, and generates an image related to the visualization object based on the visualization information, comprising storing means for previously storing pattern information representing a pattern of ray paths, and ray path determining means for determining the ray path for generating the visualization information based on the pattern information.

According to the first aspect of the present invention, the visualization object is formed with the three-dimensional array of voxels. The ray casting is performed and the visualization information is generated for each unit ray path based on the voxel information given to the at least one voxel on the ray path. The image related to the visualization object is generated based on the visualization information.

In the present invention, particularly, the pattern information representing the pattern of the ray paths is previously stored in the storing means. When the visualization information is to be generated for each unit ray path, the ray path for the ray casting is determined based on the pattern information stored in the storing means. Thus, hardware can be used more easily than in the prior art in which each ray path is generated based on a numeric operation. As a result, it is possible to generate the image related to the visualization object at a high speed.

A second aspect of the present invention is directed to an image processor wherein the pattern information specifies the voxels on each ray path.

According to the second aspect of the present invention, at least one voxel on each ray path is specified by the pattern information. The visualization object according to the present invention is formed with the three-dimensional array of voxels. Therefore, information specifying the voxel on each ray path, for example, discrete numeric information, is set as the pattern information so that the pattern of the ray paths can be recorded in the storing means with sufficient required information.

A third aspect of the present invention is directed to the image processor wherein the pattern information represents a pattern of ray paths passing through a two-dimensional array of the voxels.

According to the third aspect of the present invention, the ray path determining means can determine a necessary ray path for casting onto the three-dimensional array of the voxels by placing the pattern information in the voxel space vertically and horizontally or inverting the same. When the pattern information is to be stored in the storing means, memory capacity can be reduced.

A fourth aspect of the present invention is directed to an image synthesizing apparatus wherein the pattern information includes information specifying a voxel position where the plurality of ray paths branch away from each other.

According to the fourth aspect of the present invention, the visualization object is formed with the three-dimensional array of the voxels. Therefore, if a large number of rays are to be considered in image processing, each ray which penetrates the visualization object shares some voxels to be penetrated with some other rays, and branches from any of the voxels. According to this aspect of the present invention, information specifying a branch position is stored as the pattern information in the storing means so that the pattern of the ray path can preferably be stored.

A fifth aspect of the present invention is directed to an image synthesizing apparatus comprising voxel information storing means for storing voxel information given to voxels forming a visualization object, pattern information storing means for storing pattern information representing a pattern of voxel trace paths which is used for reading the voxel information from the voxel information storing means, voxel information reading means for reading the voxel information from the voxel information storing means based on the pattern information stored in the pattern information storing means, and image generating means for generating an image related to the visualization object based on the voxel information read by the voxel information reading means.

According to the fifth aspect of the present invention, the voxel information given to the voxels forming the visualization object is stored in the voxel information storing means. The pattern information representing the pattern of the voxel trace paths which is used for reading the voxel information from the voxel information storing means is stored in the pattern information storing means. The voxel information reading means reads the pattern information from the pattern information storing means, and reads the voxel information from the voxel information storing means based on the pattern information. An image related to the visualization object is generated based on the voxel information read by the voxel information reading means. Thus, image generation can be performed more quickly than in a conventional technique in which a reading path is generated by numerical operation in real time.

A sixth aspect of the present invention is directed to an image synthesizing apparatus wherein the pattern information specifies the voxels on each voxel trace path.

According to the sixth aspect of the present invention, the voxels on the path are specified by the pattern information. The visualization object according to the present invention is formed by the voxel. Therefore, the information specifying the voxels on the path from which the voxel information is read is set as the pattern information so that the pattern of the reading can be recorded in the storing means with required sufficient information.

A seventh aspect of the present invention is directed to the image synthesizing apparatus wherein the pattern information represents a pattern of reading paths for a two-dimensional array of voxels.

According to the seventh aspect of the present invention, the voxel information reading means can acquire a necessary path by placing the pattern represented by the pattern information in the voxel space vertically and horizontally or inverting the same. When the pattern information is to be stored in the storing means, memory capacity can be reduced.

An eighth aspect of the present invention is directed to an image synthesizing apparatus wherein the pattern information includes information specifying a voxel position where the voxel trace paths branch away from each other.

According to the eighth aspect of the present invention, the visualization object is formed with the voxels. Therefore, if a large number of reading paths are to be set, each path inevitably passes through voxels which are partially identical to those of other paths and branches in any of the voxels. According to this aspect of the present invention, the information specifying the branch position is stored as the pattern information in the storing means so that the pattern of the reading path for the voxel information can preferably be stored.

DESCRIPTION OF THE PREFERRED EMBODIMENT

An embodiment of the present invention will be described below in detail with reference to the drawings.

Figure 1:
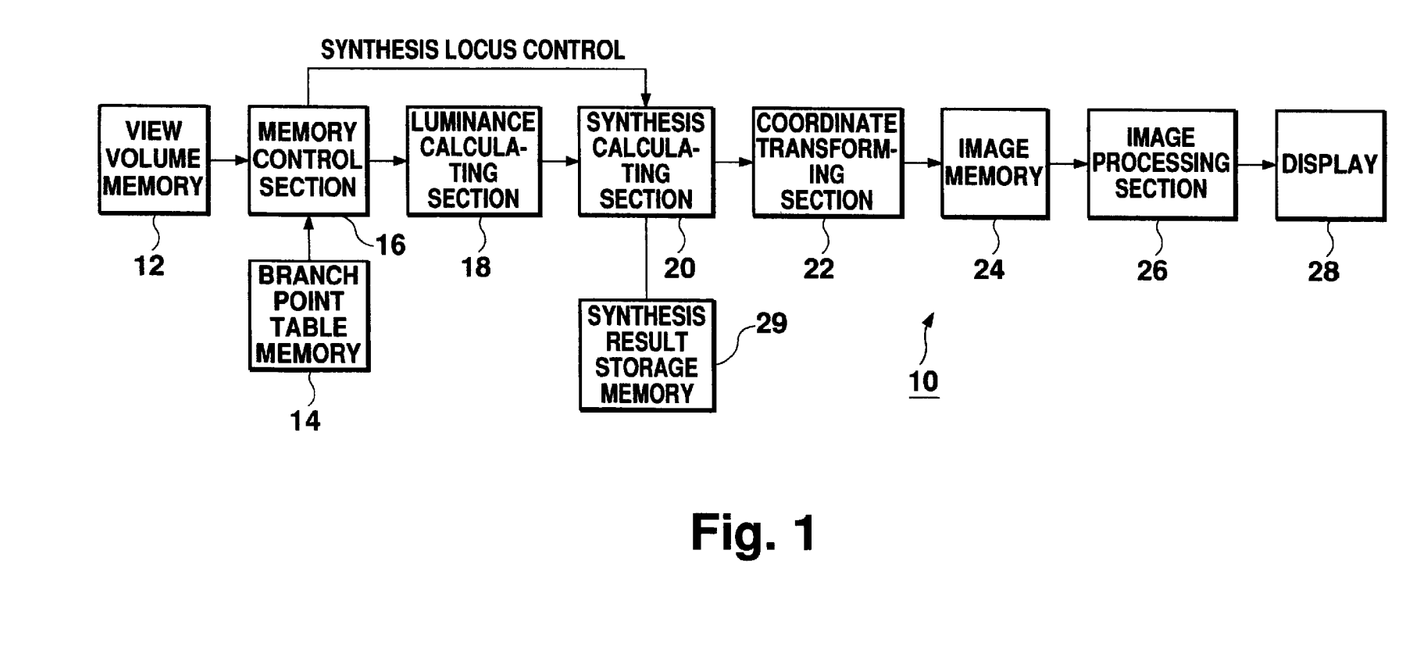
FIG. 1 is a functional block diagram showing an image synthesizing apparatus according to an embodiment of the present invention.

FIG. 1 is a functional block diagram showing an image synthesizing apparatus according to the present embodiment. As shown in FIG. 1, an image synthesizing apparatus 10 comprises a view volume memory 12, a branch point table memory 14, a memory control section 16, a luminance calculating section 18, a synthesis calculating section 20, a coordinate transforming section 22, an image memory 24, an image processing section 26, a display 28 and a synthesis result storage memory 29.

The view volume memory 12 serves to store voxel information of each voxel constituting a 3D object which is a visualization object, and is formed of RAM or ROM. The voxel information includes various measured data (voxel values), and opacity and color information corresponding to the measured data. For example, in a case where the image synthesizing apparatus 10 is applied to a medical image processor, a CT value obtained by measurement of an X-ray CT device, a T value obtained by measurement of a MRI device and the like can be used as the voxel values.

Figure 2:
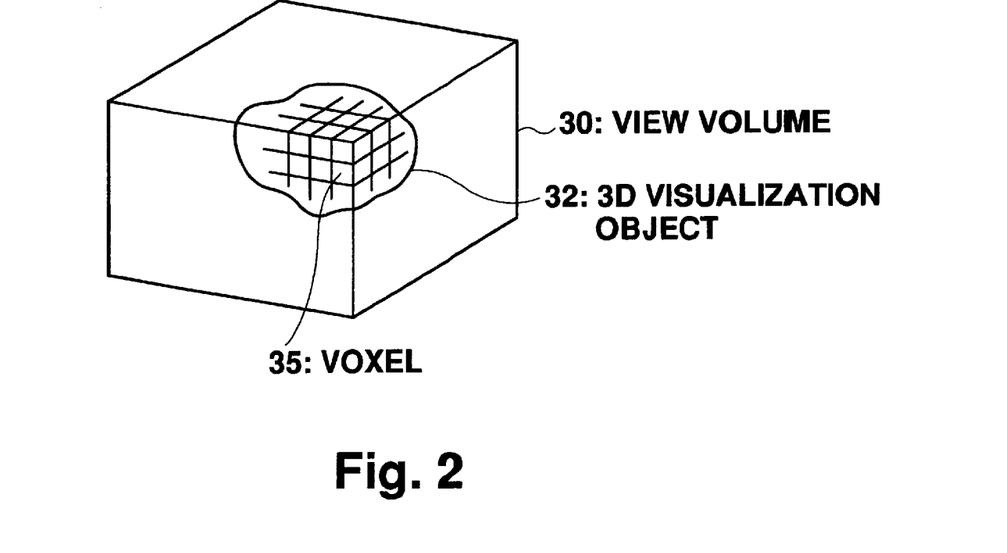
FIG. 2 is a diagram illustrating information stored in a view volume memory.

FIG. 2 is a diagram illustrating voxel information stored in the view volume memory 12. As shown in FIG. 2, a 3D object 32 to be visualized is placed in a view volume 30. The view volume 30 is a voxel space which is a processing object of the image synthesizing apparatus 10. Voxel information of each voxel 35 constituting the 3D object 32 which is placed in the view volume 30 is stored in the view volume memory 12.

The branch point table memory 14 serves to store a branch point table indicating reading paths which are used for reading the voxel information from the view volume memory 12.

Figure 3:
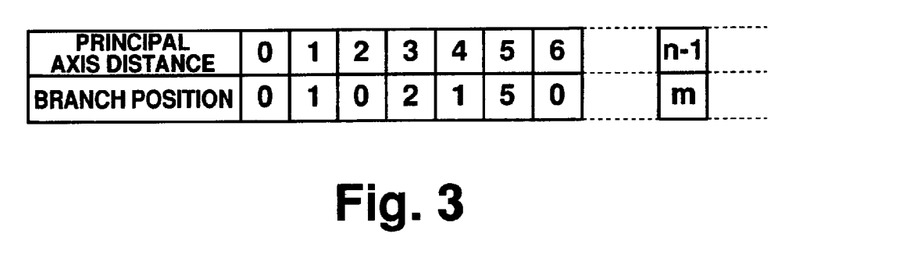
FIG. 3 shows an example of a branch point table.
Figure 4:
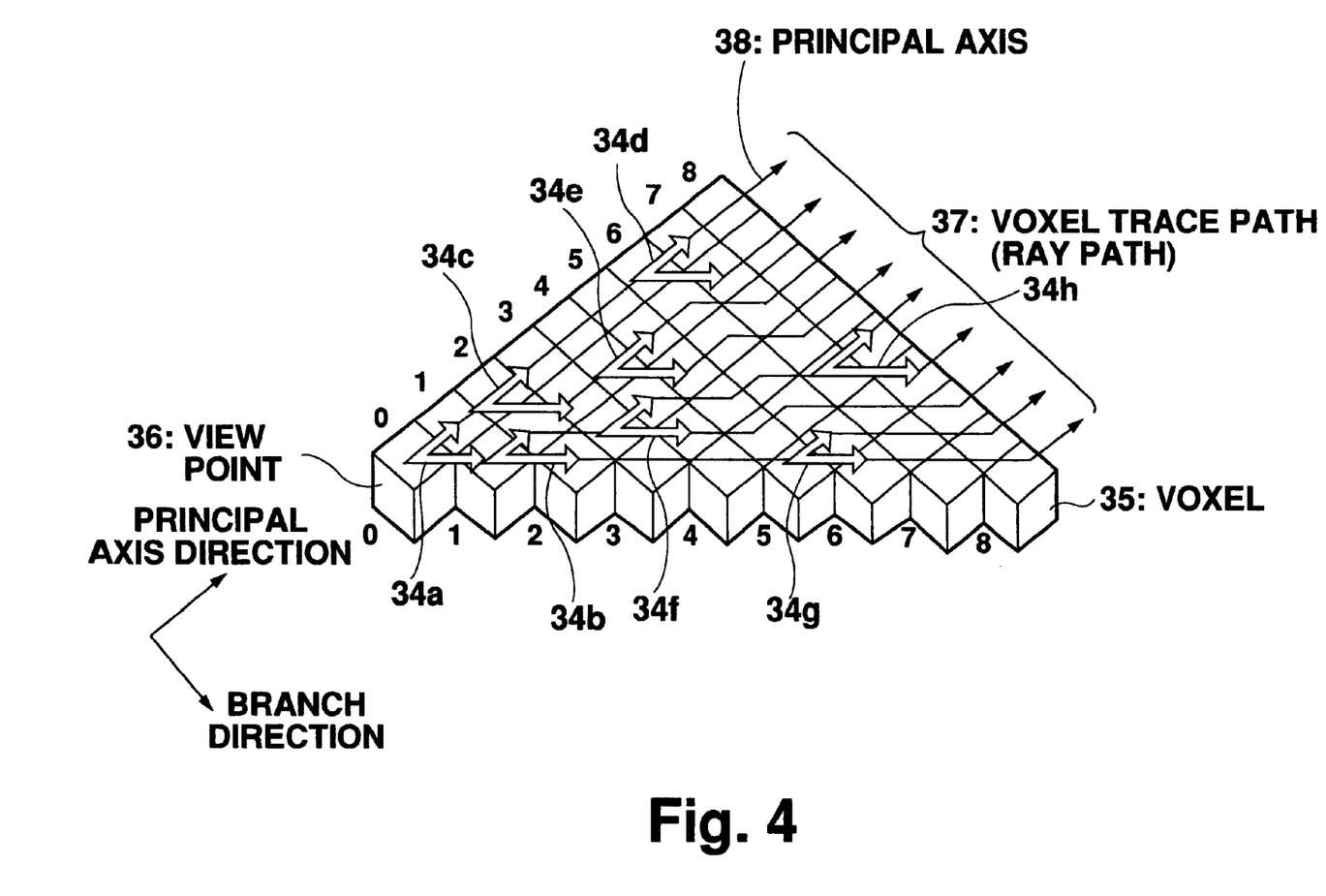
FIG. 4 is a diagram showing a ray path specified by the branch point table.
Figure 5:
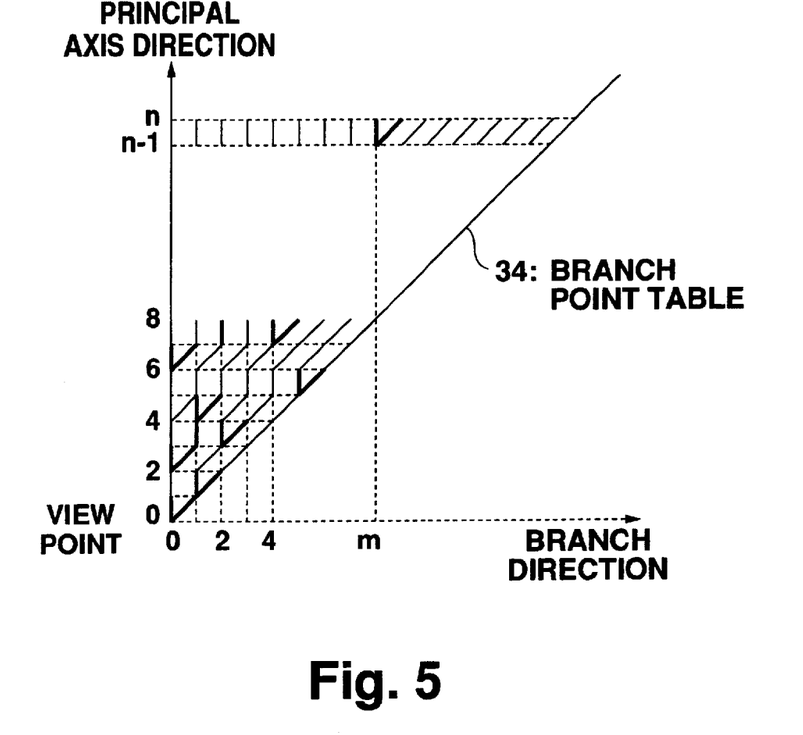
FIG. 5 is a schematic chart showing the contents of the branch point table.

FIG. 3 shows an example of the branch point table. FIGS. 4 and 5 illustrate the contents of record in the branch point table. As shown in FIG. 4, a branch point table 34 serves to specify the reading path which is used for reading the voxel information from the view volume memory 12, and to specify an operation path for a two-dimensional array of voxels 35 (hereinafter referred to as a "ray path" or "voxel trace path"). As shown in FIG. 4, a view point 36 is set to one of the voxels 35 and a principal axis 38 is set in one of adjacent directions in the two-dimensional array of the voxels 35. According to the branch point table 34, a voxel trace path 37 is set to a portion having an expansion of 45° from the principal axis 38. The voxel trace path 37 corresponds to each path for a unit ray with a light source placed on the view point 36. As one unit ray radiated from the view point 36 proceeds in a direction of the principal axis 38, it repeatedly branches in eight branch positions 34a to 34h and is finally changed into nine unit rays on an end line (where a distance in a direction of the principal axis is 8).

FIG. 5 is a schematic chart showing the branch positions 34a to 34h. As shown in FIG. 5, a point where a distance in a direction of a principal axis (hereinafter referred to as a principal axis distance) is 0 and a distance in a branch direction (hereinafter referred to as a branch distance) is 0 corresponds to the view point 36. In the following, a position of the view point will be hereinafter abbreviated to (0, 0). Similarly, a position where the principal axis distance is n and the branch distance is m will be abbreviated to (n, m). Using these abbreviations, the branch position 34a corresponds to the position (0, 0), the branch position 34b corresponds to a position (1, 1), the branch position 34c corresponds to a position (2, 0), the branch position 34d corresponds to a position (6, 0), the branch position 34e corresponds to a position (4, 1), the branch position 34f corresponds to a position (3, 2), the branch position 34g corresponds to a position (5, 5), and the branch position 34h corresponds to a position (7, 4) in FIG. 4. A unit ray radiated from the position (0, 0) acting as the view point branches into two unit rays at the position (0, 0), and further branches into three unit rays at the position (1, 1). Subsequently, one of the unit rays branches at the positions (3, 2), (4, 1), (5, 5), (6, 0) . . . (n−1, m), and is divided into (n+1) unit rays at a point having a principal axis distance of n. Thus, only one of the unit rays radiated from the view point branches at the same principal axis distance. For this reason, the branch point table 34 shown in FIG. 3 stores, with a corresponding relationship, the principal axis distance and the branch distance of the unit ray which branches at the principal axis distance.

The memory control section 16 properly reads information about the branch position from the branch point table 34, performs addressing corresponding to the information about the branch position, and reads predetermined voxel information on the voxel trace path from the view volume memory 12.

The luminance calculating section 18 calculates luminance information related to each voxel based on the voxel information thus read out. Furthermore, the synthesis calculating section 20 calculates the luminance information for an operation path based on the luminance information of each voxel on the operation path.

The synthesis result storage memory 29 is connected to the synthesis calculating section 20. A result of synthesis obtained by the synthesis calculating section 20 is stored in the synthesis result storage memory 29. The synthesis calculating section 20 performs a synthesis calculation by adding an output of the luminance calculating section 18 and the contents of the synthesis result storage memory 29 specified by synthesis locus control.

Voxel trace is performed in parallel. Therefore, the processing proceeds in such a manner that surfaces to be processed are sequentially distant from the view point. Accordingly, the synthesis result storage memory 29 stores, for one surface, a result of the calculation obtained by the synthesis calculating section 20. The synthesis calculating section 20 performs a synthesis calculation according to a vector group indicative of a destination of the synthesis calculation for each voxel on one surface to be processed.

If all the calculations for one surface are to be performed in parallel, the number of calculations is increased enormously so that a large number of hardware resources are required. A plurality of predetermined processings are repeated to perform processing for one surface. For example, if a surface of a view volume has a size of N×N, n voxels are processed in parallel each time. Consequently, the processing is performed N×N/n times to completely process one surface. For example, N is equal to 256 and n is equal to 32.

Figure 6:
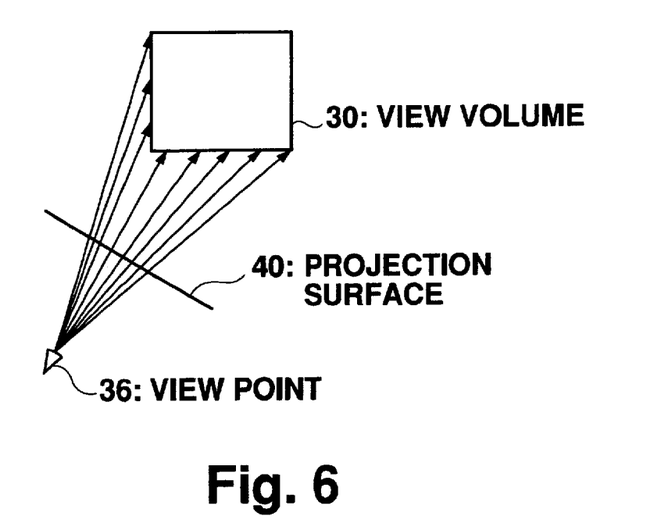
FIG. 6 is a diagram showing a perspective projection in a coordinate transforming section.

The coordinate transforming section 22 performs a coordinate transforming operation shown in FIG. 6 based on luminance information for each operation path thus obtained (which will be hereinafter referred to as path luminance information), and projects an image on a projection surface 40, thereby generating information for image display. The image memory 24 serves to store information calculated by the coordinate transforming section 22. The image processing section 26 is formed by an image synthesizing IC or the like, and serves to control the display 28 based on the information stored in the image display memory 24 and to synthesize images of the 3D object 32. The display 28 is display device formed by an LCD, a Braun tube or the like.

Operation of the image synthesizing apparatus 10 having the above-mentioned structure will be described below.

Figure 7:
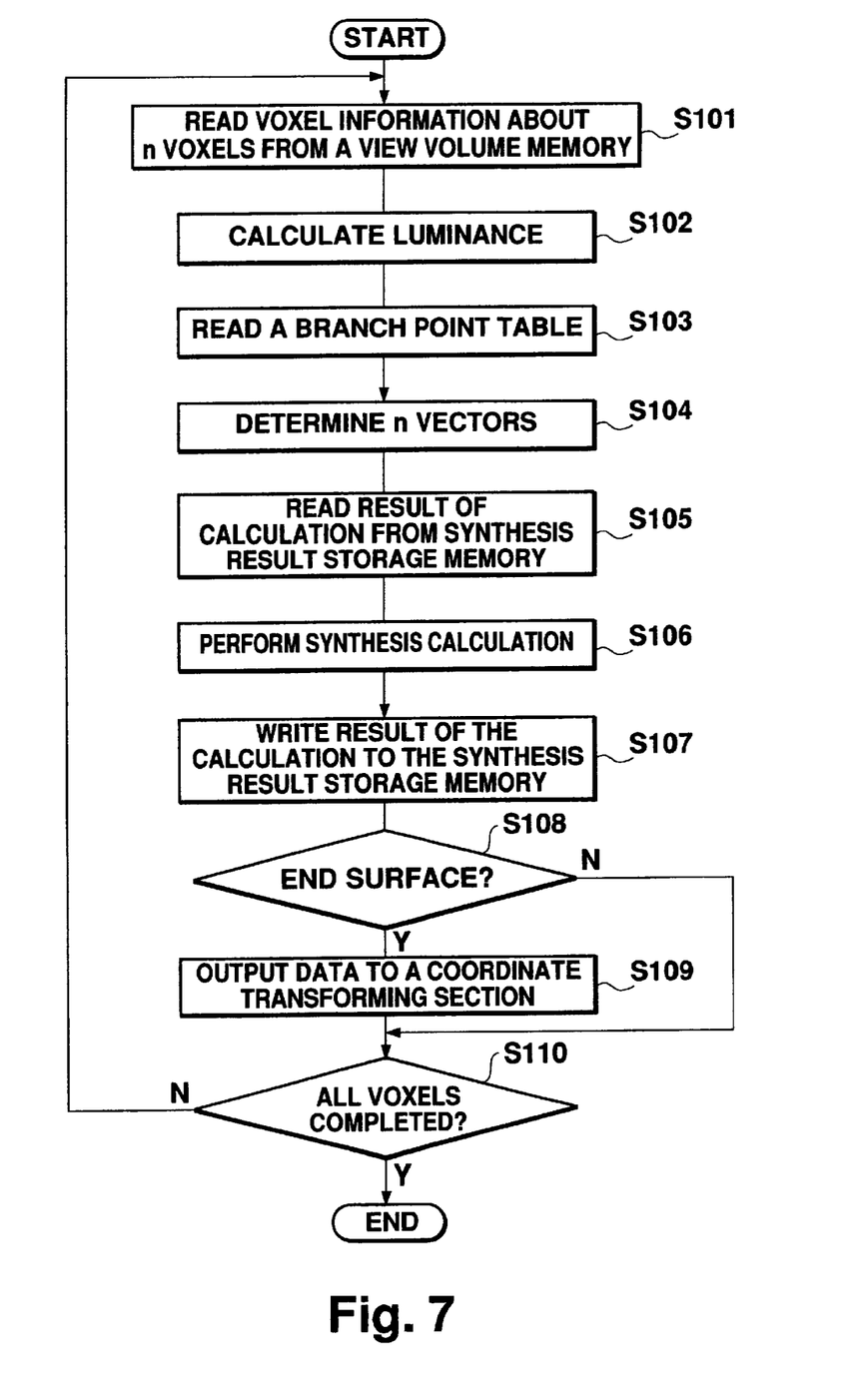
FIG. 7 is a flow chart showing operation of the image synthesizing apparatus according to the embodiment of the present invention.
Figure 8:
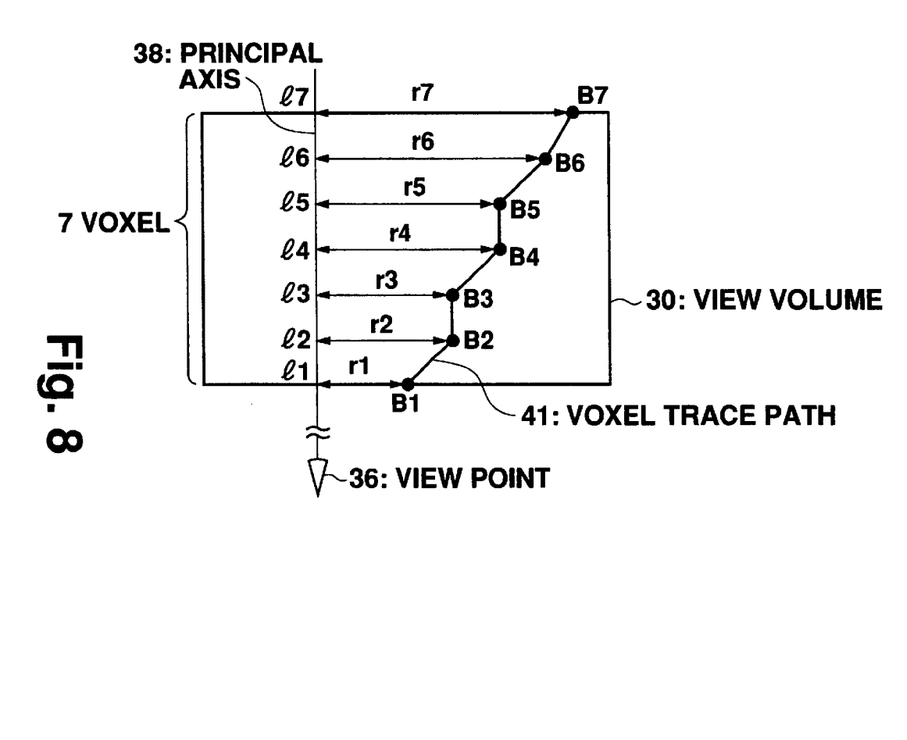
FIG. 8 is a chart illustrating an example of a voxel trace path in the image synthesizing apparatus according to the embodiment of the present invention.

FIG. 7 is a flow chart for explaining the action of the image synthesizing apparatus 10. FIG. 8 is a chart illustrating one example of an operation processing (one voxel trace) of the image synthesizing apparatus 10. It is assumed that the view volume 30 has seven voxels arranged in the direction of the principal axis 38. In FIG. 8, a black circle represents voxels B1 to B7 on a voxel trace path 41 which form the view volume 30. In the following description, a position of a voxel Bn will be abbreviated to (ln, rn). A position of a voxel which is a current operation object on the voxel trace path 41 will be hereinafter referred to as a current position.

First of all, the memory control section 16 reads voxel information about n voxels from one surface of the view volume memory 12 (starting from a surface closer to the view point) (S101). Next, the memory control section 16 sends the read voxel information to the luminance calculating section 18, and the luminance calculating section 18 calculates luminance information of the voxel based on the voxel information (S102).

Furthermore, the memory control section 16 reads the branch point table 34 from the branch point table memory 14. More specifically, the memory control section 16 reads, from the branch point table 34, a branch position stored corresponding to the principal axis distance of the voxel in the current position (S103). Based on the branch position, n vectors are determined (S104). A result of the last synthesis calculation is then read from the synthesis result storage memory 29. Based on the result of the last synthesis calculation and luminance information calculated by the luminance calculating section 18, a synthesis calculation is performed to obtain path luminance information (S106). A maximum predetermined voxel value of the voxel on the voxel trace path 41, a serial addition value of the predetermined voxel values and the like can be employed as the path luminance information. A result of the calculation is written to the synthesis result storage memory 29 (S107).

Next, it is decided whether or not the current position is an end surface of the view volume 30, that is, whether or not the current position is identical to a position of any voxel forming a side surface of the view volume 30 (S108). If the current position is not the end surface, it is decided whether or not the processing has been completed for all the voxels on the surface to be processed (S110). If the processing has not been completed for all the voxels on the surface to be processed, the routine returns to Step S101 so that the next n voxels are repeatedly processed. Thus, if the processing is completed for one surface, the processing is repeated on the next surface in a direction away from the view point.

When such processing is performed to reach the end surface and the decision is YES at Step S108, data is output to the coordinate transforming section 22. At Step S109, n data are output each time. When this processing is completed for all the voxels and the decision at Step S110 is YES, the processing ends. The image processing section 26 performs image synthesis of the 3D object 32 in response to the output of the coordinate transforming section 22, and displays the synthesized image on the display 28.

Figure 9:
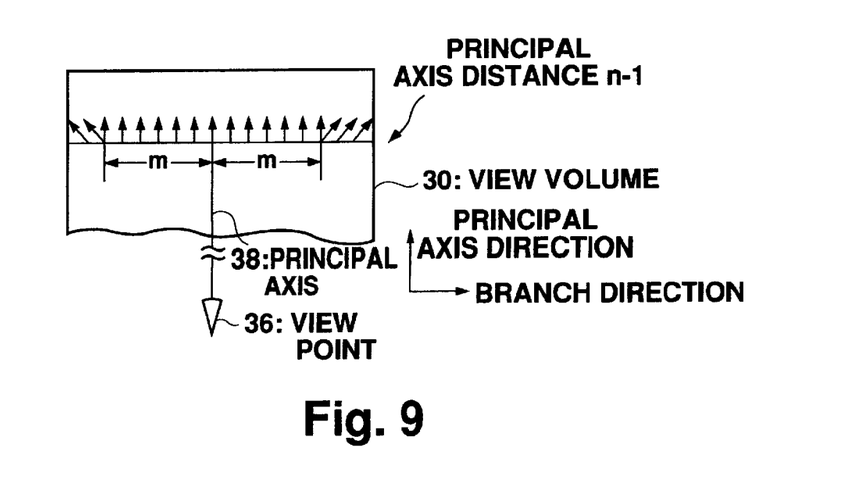
FIG. 9 is a diagram illustrating update of a current position on a voxel trace path.

FIG. 9 is a diagram illustrating update processing in the current position. The voxels are traced in parallel as described above and one of the voxels will be taken as an example. More specifically, FIG. 9 illustrates the update processing to be performed in the current position when a branch position m corresponding to a principal axis distance of (n−1) is read from the branch point table 34, that is, the current position is a point having the principal axis distance of (n−1).

As shown in FIG. 9, a reference of current position update is varied by forming, as a boundary, a point placed at a branch distance of m from the principal axis 38 in a position having the principal axis distance of (n−1). If the current position is (n−1, m), the point is a branch position. Therefore, voxel positions having branch distances of m and (m+1) are intended for the next current position at a point having a principal axis distance of n. In this position, conceptually, a rectilinear vector and a branch vector are generated in order to update the current position. In this case, the memory control section 16 sets, as a new current position, a position of a voxel which has not been traced. If the current position has a principal axis distance of (n−1) and a branch distance of (m+1) or more, a position having the principal axis distance of n and a branch distance obtained by adding 1 to a branch distance of a previous current position is set as a new current position. Conceptually, the branch vector is generated and is added to the current position so that the current position expands in the direction of branch.

In a case where the current position has the principal axis distance of (n−1) and a branch distance of (m−1) or less, a position having the principal axis distance of n and the same branch distance as in the previous current position is set as a new current position. Conceptually, a rectilinear vector is generated and is added to the current position. For example, if a voxel B4 is in the current position in FIG. 8, a branch position corresponding to a principal axis distance 14 is read from the branch point table 34 shown in FIG. 3 and a value of the branch position is compared with r4. Based on the comparison, r4 is updated. More specifically, if r4 is greater than the read branch position, 1 is added to r4. Conversely, if r4 is smaller than the read branch position, a value of r4 is kept as it is. If the read branch position is equal to r4, the value of r4 is kept or increased so as to select a voxel trace path which has not been selected. As described above, the memory control section 16 updates the current position.

According to the image synthesizing apparatus 10 described above, it is not necessary to successively calculate a voxel on a voxel trace path by a numerical operation. Therefore, a visualization object can be generated at a high speed.

The branch point table 34 defines a voxel trace path (ray path) for a two-dimensional array of the voxel, and defines a path for a ray within a range of 45° which is radiated from a position of the view point 36. The image synthesizing apparatus 10 can acquire paths for rays radiated from the view point in all directions based on only information which specifies ray paths within the limited range.

Figure 10:
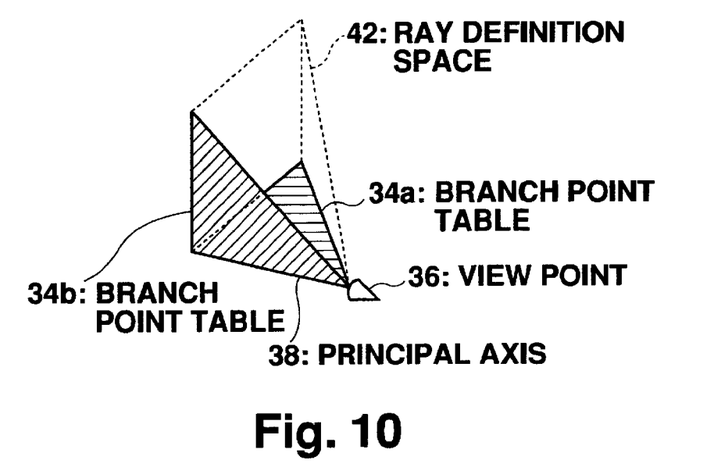
FIG. 10 is a diagram illustrating combinatorial utilization of the branch point table.
Figure 11:
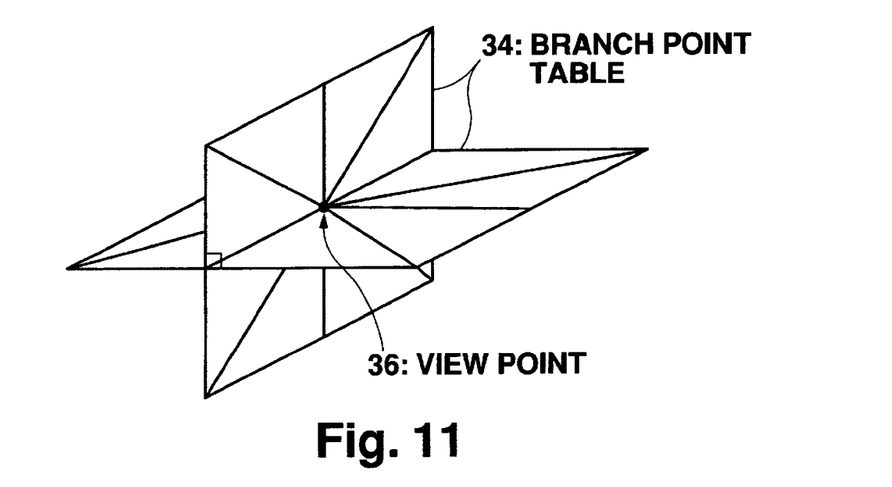
FIG. 11 is a diagram illustrating the combinatorial utilization of the branch point table.

FIGS. 10 and 11 illustrate a method for acquiring ray paths in all directions based on the information of the branch point table 34. In the image synthesizing apparatus 10, conceptually, two branch point tables are first prepared as shown in FIG. 10. A branch point table 34a is placed horizontally with respect to the view point, and a branch point table 34b is placed vertically in such a manner that a principal axis of the branch point table 34a is coincident with that of the branch point table 34b. Consequently, all branch positions of a ray which passes through a ray definition space 42 having a pyramid shape in FIG. 10 can be acquired by using the branch point tables 34a and 34b. Then, if 16 branch point tables 34 are placed as shown in FIG. 11, a state of branched rays radiated from the view point 36 in all directions can be described. In the image synthesizing apparatus 10, branch point positions related to rays in a two-dimensional plane are stored in the branch point table 34 so that branch positions of all rays radiated from the view point 36 can be acquired by placing the branch point positions vertically and horizontally or inverting them.

Various changes can be made to the above-mentioned image synthesizing apparatus 10.

Figure 12:
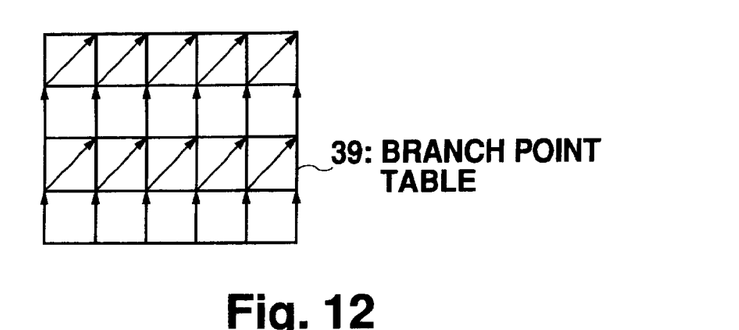
FIG. 12 is a diagram showing the branch point table for realizing parallel projection.
Figure 13:
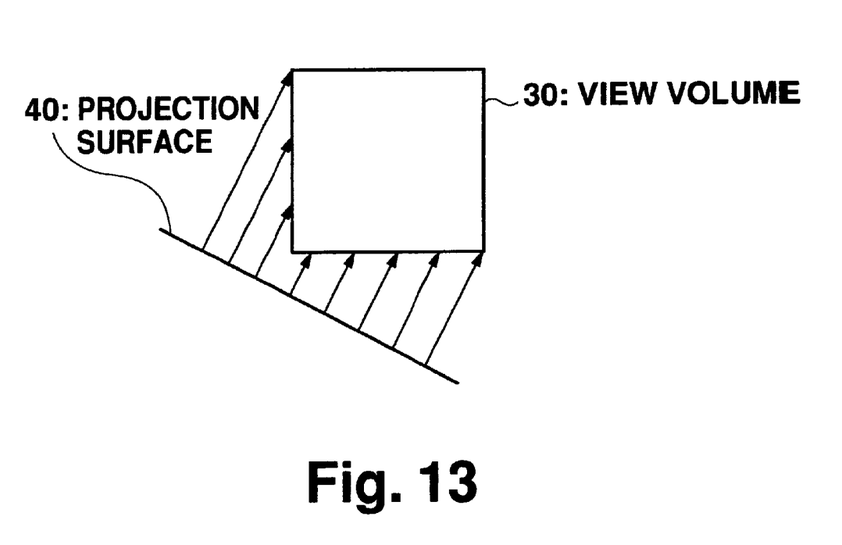
FIG. 13 is a diagram illustrating the parallel projection.

While the above-mentioned image synthesizing apparatus 10 has embodied a so-called perspective projection technique in which the view point 36 is positioned at a finite distance from the 3D object 32, for example, it can also use so-called parallel projection in which the view point 36 is positioned at an infinite distance from the 3D object 32. In this case, each path is preferably defined in such a manner that each ray path does not branch as shown in FIG. 12, and information specifying the path is stored in the branch Anoint table memory 14. In a case where path luminance information is calculated for each path by using a branch point table 39 thus recorded, the coordinate transforming section 22 preferably performs a coordinate transforming processing to obtain an object image as shown in FIG. 13.

The branch point table 34 used in the image synthesizing apparatus 10 should properly set branch positions in order to obtain more natural synthetic images.

First of all, the voxel trace path should have a polygonal line in principle. However, it is desirable that the polygonal line should deviate from an original visual line, that is, a straight line, as little as possible.

Secondly, each voxel trace path is generated by repetitive branching. If a principal axis distance of a voxel trace path is almost equal to that of another voxel trace path, it is desirable that the numbers of branches performed before reaching that point should be as equal as possible.

Figure 14:
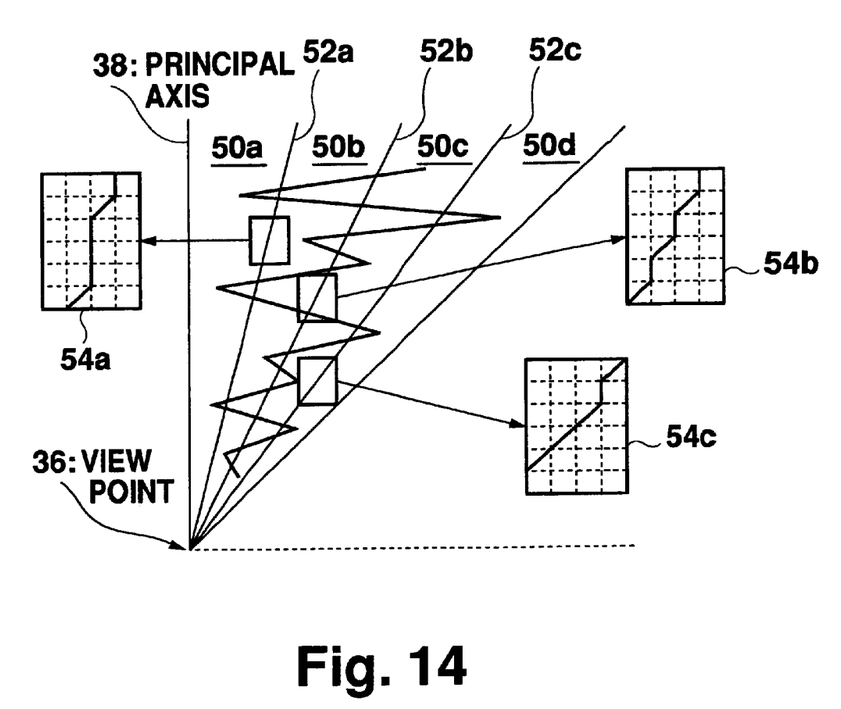
FIG. 14 is a flow chart illustrating procedure for creating the branch point table.

The voxel trace path which meets the above-mentioned two conditions can be obtained in the following manner. FIG. 14 illustrates a method for defining the voxel trace path. In this method, a range of 45° from the principal axis is first divided into four portions as shown in FIG. 14. In the following description, each region will be indicated as 50a to 50d. A boundary line between the regions 50a and 50b will be indicated as 52a, a boundary line between the regions 50b and 50c will be indicated as 52b, and a boundary line between the regions 50c and 50d will be indicated as 52c.

It is preferable that branch points should be placed uniformly in the four regions 50a to 50d in order to meet the first condition. The boundary line 52b between the regions 50b and 50c partitions the regions 50a to 50d into just two portions. Therefore, it is desirable that a voxel trace path in this position should be formed by alternately placing a rectilinear vector and a branch vector as shown by an arrow 54a in FIG. 14.

Furthermore, the boundary line 52a between the regions 50a and 50b is positioned in the middle of the boundary line 52b and the principal axis 38. Therefore, it is desirable that a voxel trace path in this position should be formed by combining three rectilinear vectors and one branch vector respectively as shown by an arrow 54b in FIG. 14.

It is desirable that a voxel trace path positioned on the boundary line 52c between the regions 50c and 50d should be formed by uniformly combining one rectilinear vector and three branch vectors as shown by an arrow 54c in FIG. 14. If a branch point is set as described above, the first condition can be met.

The region is not always divided into four portions. If a distance from the view point is increased, the definition region is divided into 8 or 16 portions by a boundary line. In the same way, a branch point can be selected.

Figure 15:
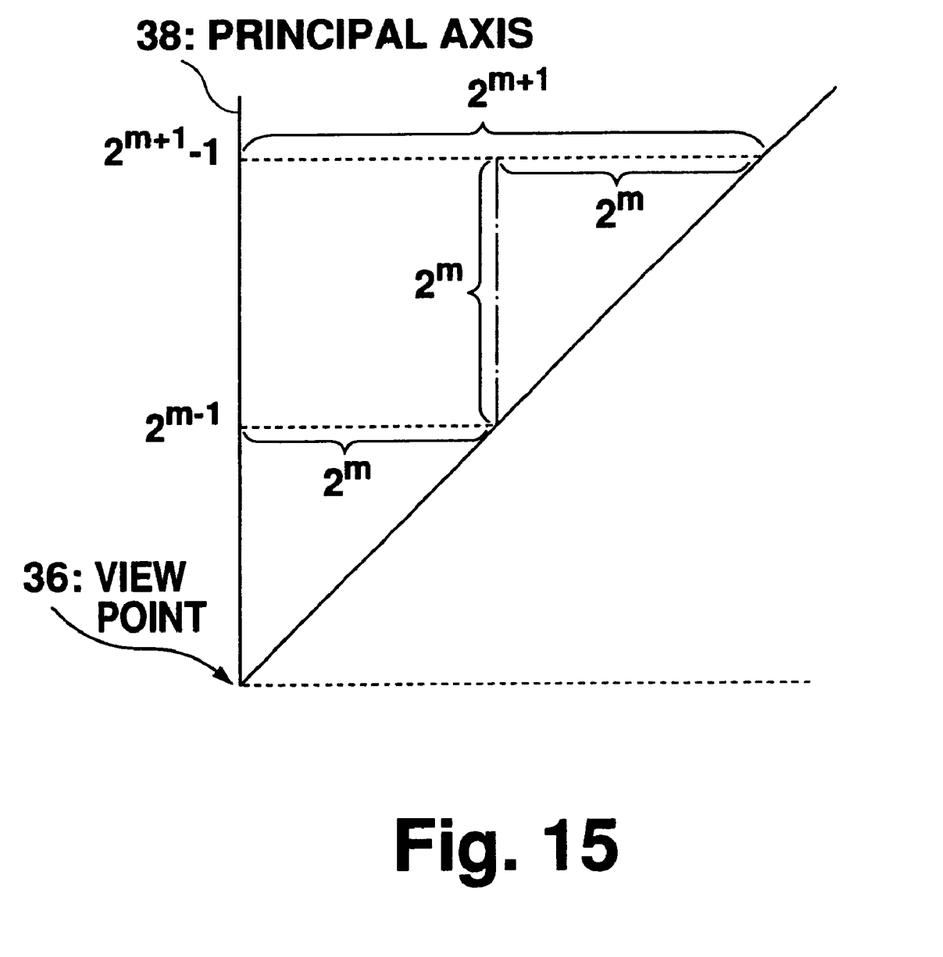
FIG. 15 is a flow chart illustrating the procedure for creating the branch point table.

Next, a technique for meeting the second condition will be described below. As shown in FIG. 15, there are 2m voxel trace paths at a point having a principal axis distance of (2m−1). There are 2m+1 voxel trace paths at a point having a principal axis distance of (2m+1−1). Accordingly, the 2m voxel trace paths are increased between the points having the principal axis distances of (2m−1) and (2m+1−1). If the 2m voxel trace paths placed at the point having the principal axis distance of (2m−1) branches once respectively before reaching the point having the principal axis distance of (2m+1−1), the numbers of branches of the voxel trace path are equal between the positions having the principal axis distances of (2m−1) and (2m+1−1). Thus, a pattern which meets the above-mentioned second condition can be obtained.

The above-mentioned procedure is applied to a sequence of the branch of the 2m voxel trace paths in the position having the principal axis distance of (2m−1). The following equation expresses the sequence of the branch.

$$k = 0 : p = 2^{m-1}$$ [Equation 1]

$$k = 1 : p = 2^{m-1} - 1$$

$$k = 2 \text{ to } 3 : p = 2^{m-1} + (-1)^k 2^{m-2}$$

$$k = 4 \text{ to } 7 : p = 2^{m-1} + (-1)^k \left\{ 2^{m-2} + (-1)^{\frac{k-1}{2}} 2^{m-3} \right\}$$

$$k = 8 \text{ or more:}$$

$$p = 2^{m-1} + (-1)^k [2^{m-2} +$$

$$(-1)^{\frac{k-1}{2}} \left\{ 2^{m-3} + \ldots (-1)^{\frac{k+2^{m-1}-1}{2^{m-1}}} 2^0 \right\} ]$$

wherein k represents the sequence of the branch and $0 \leq k < 2m$, and P represents an identification number of the voxel trace path in the position having the principal axis distance of (2m−1). In the point having the principal axis distance of (2m−1), P (=1 to 2m) is sequentially attached to the 2m voxel trace paths closer to the principal axis.

Figure 16:
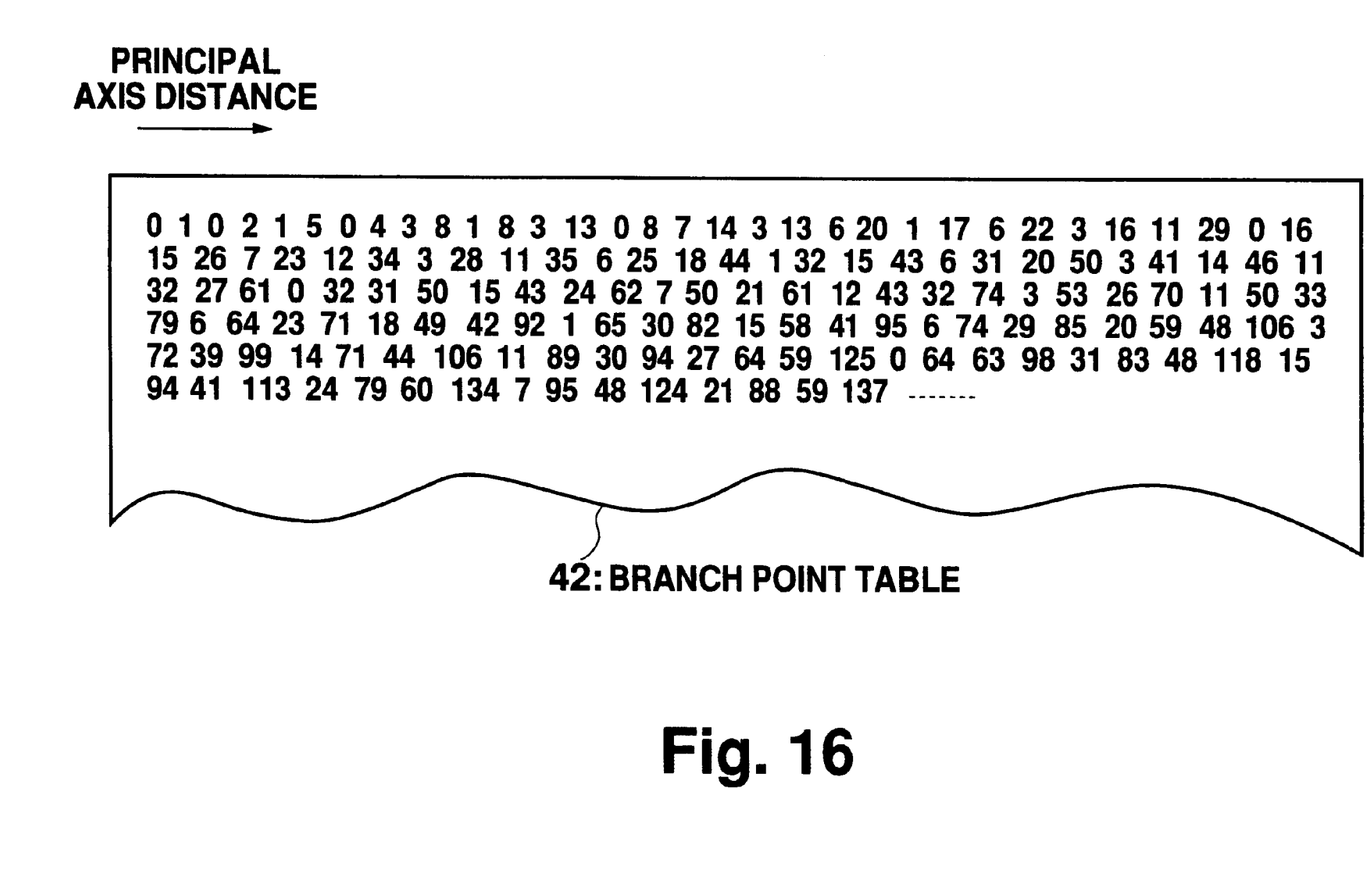
FIG. 16 shows an example of the branch point table.

A value of P at the point having the principal axis distance of (2m−1) is obtained using the above-mentioned equation. Therefore, if the value of P is converted to correspond to a distance from the principal axis, a branch point table shown in FIG. 16 can be obtained. By using a branch point table 42 shown in FIG. 16, the image synthesizing apparatus can perform more natural perspective projection.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An image processor which, during each of a plurality of sequential cycle periods, casts number of unit rays onto a virtual three-dimensional object formed with a three-dimensional array of voxels, generates visualization information for each ray path based on voxel information assigned to at least one voxel on the ray path, and generates an image related to the visualization objected based on the visualization information, comprising:

storing means for storing pattern information representing a pattern of the ray paths of a current one of sequential cycle periods, the pattern information being based on at least the voxel information of the at least one voxel in the ray path wherein, the pattern information includes information specifying a voxel position where the plurality of ray paths branch away from each other after a first initial calculation; and ray path determining means for determining, for a next one of a plurality of sequential cycle periods, the ray path for generating the visualization information based on the previously stored pattern information.

2. The image synthesizing apparatus according to claim 1, wherein the pattern information specifies the voxels on each ray path.

3. The image synthesizing apparatus according to claim 1, wherein the pattern information represents a pattern of ray paths passing through a two-dimensional array of the voxels.

4. An image synthesizing method for casting a number of unit rays during each of a plurality of cycle periods onto a visualization object formed with a three-dimensional array of voxels, generating visualization information for each ray path based on voxel information assigned to at least one voxel on the ray path, and generating an image related to the visualization object based on the visualization information, comprising the steps of:

storing pattern information representing a pattern of a current one of a plurality of sequential cycle periods, the pattern information being based on at least the voxel information of the at least one voxel in the ray path in storing means wherein, the pattern information includes information specifying a voxel position where the plurality of ray paths branch away from each other after a first initial calculation; and determining the ray path for generating the visualization information based on the pattern information of the cycle period.

5. An image synthesizing apparatus comprising:

voxel information storing means for storing voxel information assigned to voxels forming a visualization object;

pattern information storing means for storing pattern information during a plurality of cycle periods representing a pattern of voxel trace paths which is used for reading the voxel information from the voxel information storing means;

voxel information reading means for reading the voxel information from the voxel information storing means based on the pattern information stored in the pattern information storing means, the pattern information being based on at least the voxel information of the at least one voxel in the ray path wherein, the pattern information includes information specifying a voxel position where the plurality of ray paths branch away from each other after a first initial calculation; and image generating means for generating an image related to the visualization object based on the previously stored voxel information read by the voxel information reading means.

6. The image synthesizing apparatus according to claim 5, wherein the pattern information specifies the voxels on each voxel trace path.

7. The image synthesizing apparatus according to claim 5, wherein the pattern information represents a pattern of reading paths for a two-dimensional array of the voxels.

* * * * *